FIG. 6

United States Patent Office 3,509,436
Patented Apr. 28, 1970

3,509,436
OSCILLATOR SLIDE ASSEMBLY AND CONTROL CIRCUIT THEREFOR
Hubert T. Hovance, Kent, Ohio, assignor to Auto Arc-Weld Mfg. Co., Cleveland, Ohio, a corporation
Filed Mar. 27, 1967, Ser. No. 626,328
Int. Cl. H02p 1/22
U.S. Cl. 318—127                17 Claims

ABSTRACT OF THE DISCLOSURE

An oscillator slide assembly and control circuit therefor which allows the parameters of stroke width, stroke mean center position, traverse speed and dwell time to be selectively preset or altered during operation of the oscillator.

---

It is frequently desirable in the machine tool art and in particular the field of automatic welding to provide an oscillatory motion to the machine tool or welding head. In the case of welding where movement of the weldhead is effected through mechanical oscillation of the weldhead, it is desirable, and in many instances necessary, to provide means for adjusting the travel speed, stroke center position, stroke width, and end-of-stroke dwell time for the oscillator slide plate. Moreover, it has been found necessary in many applications to provide means for varying the aforementioned parameters during oscillation so that a proper weld bead can be obtained. It is particularly desirable that the adjustments for the respective parameters be made with precision to insure a satisfactory weld bead.

It is therefore one of the primary objects of the present invention to provide a novel oscillating mechanism and control circuit therefor which allows the oscillator travel speed, stroke width, dwell time, and stroke center position to be accurately set prior to oscillation or varied during oscillation of the mechanism.

Another object of the present invention is to provide an oscillator slide mechanism and control circuit therefor having a novel potentiometer bridge circuit which includes a position indicator follow-up potentiometer device cooperatively associated with the oscillator slide mechanism such that the output signal from the bridge circuit is in direct relation to the position of the oscillator slide plate.

A further object of the present invention is to provide an oscillator slide mechanism and control circuit therefor, as described, wherein the potentiometer bridge circuit further includes means for controlling the width of stroke and the mean center of the stroke of the slide plate during oscillation.

Another object of the present invention is to provide an oscillating mechanism and control circuit therefor employing a stepping motor as the primary motion actuator for the oscillating slide plate, which stepping motor in combination with a novel control circuit affords a very accurate and efficient oscillator control especially suitable for use with welding heads.

A further object of the present invention is to provide an oscillator mechanism having a control circuit which includes a potentiometer bridge circuit to provide control signals to a trigger circuit, and which control signals are dependent upon the relative position of the oscillator head during oscillation.

Another object of the present invention is to provide a control circuit for an oscillator slide assembly, which control circuit includes the novel combination of a position control circuit, a trigger circuit, trigger relays operative upon receipt of command pulses from the trigger circuit, dwell timer circuits to effect a dwell period at the end of each stroke of the oscillator slide, and a stepping motor controlled to effect linear translation of the oscillator slide.

Further objects, features and advantages of my invention, together with the organization and manner of operation thereof may best be understood by reference to the following description taken in connection with the accompanying drawings, in the several figures of which like reference numerals identify like elements, and in which.

GENERAL DESCRIPTION

Figure 1:
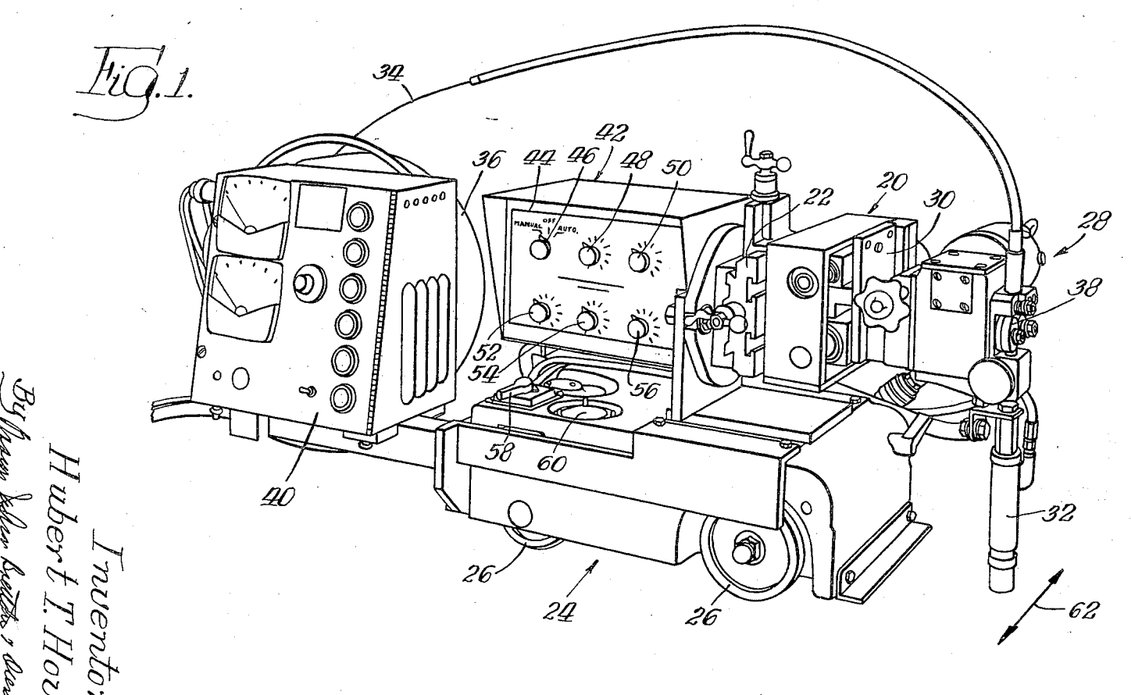
FIGURE 1 is a perspective view illustrating an oscillator slide assembly and control panel in accordance with the present invention being utilized on an automatic arc welding apparatus.

Referring now to FIGURE 1, an oscillator slide assembly, shown generally by reference numeral 20, constructed in accordance with the present invention is illustrated as being supported on a cross-slide assembly 22 in a conventional manner. The cross slide is in turn supported upon a tractor arrangement, designated generally by reference numeral 24. The tractor includes a plurality of wheel members 26 rotatably mounted in a manner to allow the tractor to be moved along the surface of a workpiece.

A weld head assembly, designated generally by reference numeral 28, is suitably secured to a plate member 30 which forms a part of the oscillator slide assembly as will be more fully described hereinbelow. The weld head assembly 28 includes a weld wire guide 32 which is adapted to have a weld wire 34 fed through the guide 32 to a position adjacent the workpiece or pieces which are to be arc welded. The weld wire 34 is supplied from a reel 36 which may be rotatably supported rearwardly of the tractor 24 in a suitable manner. The weld head assembly 28 includes a weld wire feeding means 38 which serves to advance the weld wire 34 through the guide member 32. Also mounted rearwardly of the tractor 24 is a housing or casing 40 which serves to enclose the electrical apparatus for supplying electric current to the weld wire 34 to effect the arc welding.

A control panel, shown generally at reference numeral 42, is suitably mounted rearwardly of the cross-slide assembly 22 and serves to house the circuitry and electronic components utilized in the control circuit for the oscillator slide assembly 20. By way of illustration, the control panel 42 may be provided with a front panel wall 44 having a plurality of control buttons or knobs thereon. For example, a control button 46 is provided which serves as an on-off control and further allows selection of manual or automatic control of the oscillator slide assembly. A center position control button 48, a width selector button 50, a left dwell timer button 52, an oscillator traverse speed button 54, and a right dwell timer button control 56 may also be supported by panel wall 44 to present an easily accessible control panel for the selection and control of the various parameters effecting movement of the oscillator slide assembly 20. The various control buttons 46, 48, 50, 52, 54 and 56 and their respective functional relationships to the oscillator slide assembly 20 will be more fully described hereinbelow.

An off-on switch 58 for controlling the electric power input to the control panel 42 may be conveniently located on the tractor 24 in a position easily accessible to the operator. The switch 58 may allow for the selection of manual circuit control or couple the circuit to another useful functional circuit for automatic control of the oscillator assembly. If desired, an ammeter 60 may also be conveniently located on the tractor 24 to provide a continual reading of the current supplied to the control panel 42.

In the automatic arc welding machine illustrated in FIGURE 1, an oscillatory motion may be given to the weld head assembly 28 through the oscillator slide assembly 20 as indicated by the arrows 62. By providing means for adjusting the travel speed of tractor 24 for movement in a longitudinal direction, it can be seen that a controlled weld bead can readily be obtained. Any conventional means for effecting said adjustable tractor speed may be used and forms no part of the present invention.

GENERAL DESCRIPTION OF THE OSCILLATOR CONTROL CIRCUIT

Figure 2:
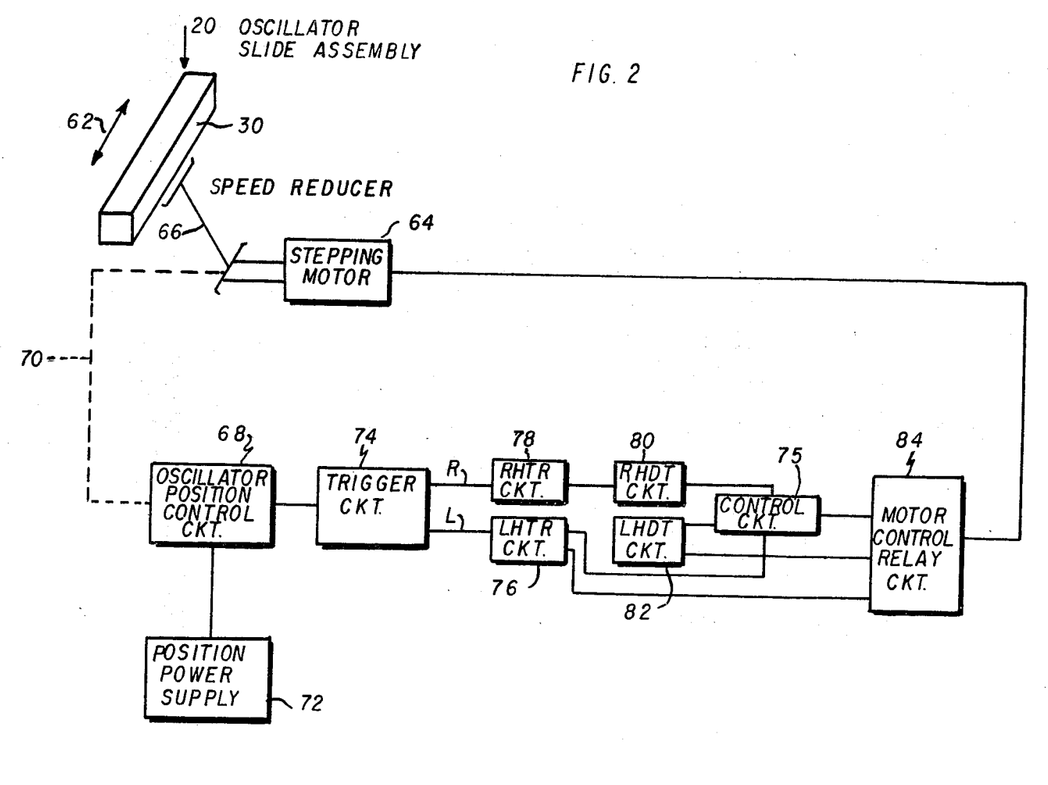
FIGURE 2 is a block diagram illustrating the oscillator slide assembly in combination with the control elements therefor.

Referring now to FIGURE 2, a block diagram is shown illustrating the various components comprising the means for effecting oscillation of the oscillator slide assembly 20. The oscillator slide assembly 20 includes the mounting slide plate 30 which is cooperatively associated with a primary actuator electric stepping motor 64 through a speed reducer means 66 for linear motion in the directions of double-ended arrow 62. Basically, the oscillatory motion of the mounting slide plate 30 through speed reducer means 66 is obtained by controlled reversal of the stepping motor 64, as will be more fully described hereinbelow.

An oscillator position control device 68 is coupled to the drive shaft of stepping motor 64 through a position follow-up potentiometer, indicated by dashed line 70, which position follow-up potentiometer serves to indicate the actual position of the slide plate 30 with reference to present parameters for the travel of the slide plate. A position power supply means 72 provides a stable voltage to the oscillator position control device 68 which in turn provides a variable output voltage signal the value of which has a direct relationship to the position of slide plate member 30. The oscillator position control 68 includes means for selectively controlling the length of stroke and the mean center of the stroke of the oscillator slide 30. The oscillator position control output signals constitute the input signals to a trigger circuit 74 which serves to change the input signals into command pulses or signals whenever the slide is moved to the preset limit of travel in either direction. As will be more fully described hereinbelow, the output command pulses of the trigger circuit 74 are divided into two separate pulses, one set of command pulses R being provided in response to an input signal indicating movement of the slide to the right hand limit, and a second set of command pulses L being provided in response to an input signal indicating movement of the slide to the left hand limit.

A left hand trigger relay circuit (LHTR) 76 and a right hand trigger relay circuit (RHTR) 78 are coupled to the trigger circuit 74 such that each relay circuit receives one of the sets of command pulses R, L produced by the trigger circuit 74. The LHTR circuit 76 serves to stop rotation of stepping motor 64 upon being energized by a command pulse from the trigger circuit 74 as a result of the slide movement to the left hand limit of travel as set by the control 68, or after being de-energized by the trigger circuit 74 at the same time that the right hand trigger relay 78 is energized when the slide moves to the right hand limit of the travel set by the position control 68. The left hand trigger relay circuit 76 thus serves to initially stop rotation of stepping motor 64 upon receipt of a travel limit indication in either direction from trigger circuit 74.

A left hand dwell timer circuit (LHDT) 82 is coupled to the trigger circuit 74 via a control circuit 75 and is enabled by trigger circuit 74 and control circuit 75 to provide a preset period of dwell at the end of movement of the slide plate member 30 to the left hand limit. After expiration of the dwell period th LHDT circuit 82 enables a motor control circuit 84 to drive the slide plate from the left to right, the circuitry locking in such condition during the movement.

With movement of the slide 30 to the right hand limit of its travel, trigger circuit 74 is operative to provide a train of command pulses to the RHTR circuit 78 and simultaneously terminates the command pulse to control circuit 75 which responsively interrupts the energizing circuit for the motor circuit 84 to stop movement of the slide plate 30 toward the right.

The RHTR circuit 78 is responsive to the train of pulses from trigger circuit 74 to enable a right hand dwell timer circuit (RHDT) 80 to initiate measurement of a preset timing period. At the end of such period the RHDT circuit signals the control circuit 75 to condition the motor control 84 to rotate the stepping motor 64 in the opposite direction (i.e., the motor drives the slide from right to left) and further reestablishes the energizing circuit to the motor. A motor speed control potentiometer 86 (FIGURE 10) may be provided in the stepping motor energizing circuit to allow selective control of the oscillator slide plate traverse speed as will be more fully described hereinbelow.

Summarizing, the trigger relays 76 and 78 on combination with the dwell timers 80 and 82, control circuit 75, and the motor control circuit 84, serve to stop the stepping motor 64 and thus the movement of slide plate member 30 at each end of its stroke, maintain the slide plate 30 at the end of each stroke for a desired length of time, and thereafter reverse the direction of motion of the slide plate 30.

SPECIFIC DESCRIPTION OF THE OSCILLATOR SLIDE ASSEMBLY

Figures 3, 4, 5:
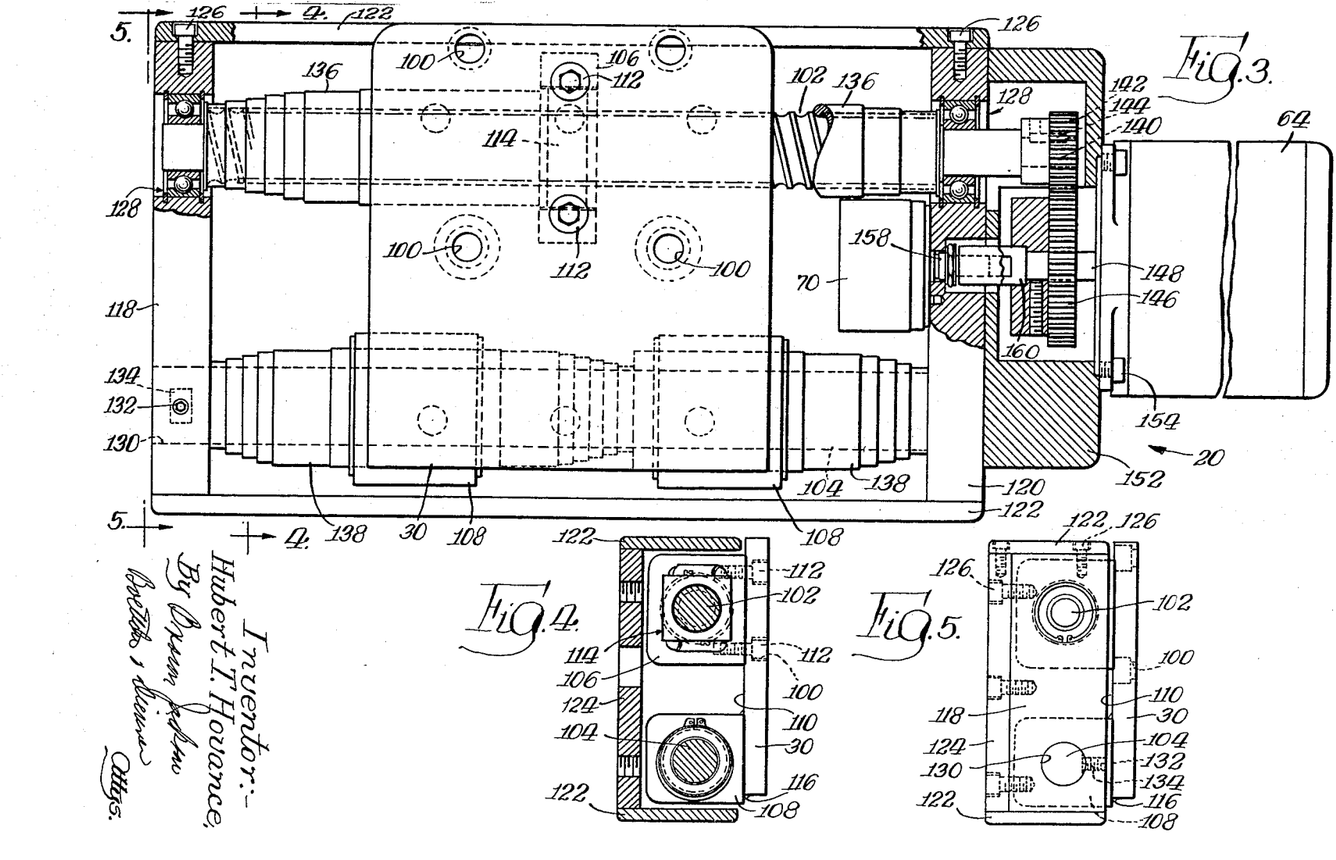
FIGURE 3 is a front elevational view, taken partly in section, of the oscillator slide assembly in accordance with the present invention.
FIGURE 4 is a vertical sectional view taken substantially along the line 4—4 of FIGURE 3.
FIGURE 5 is an elevational view of the left end of the oscillator assembly illustrated in FIGURE 3, being taken along the line 5—5 of FIGURE 3.

Referring now to FIGURE 3, taken in conjunction with FIGURES 4 and 5, the oscillator slide assembly 20 includes the oscillator slide plate member 30 which serves as a support or mounting plate for a device such as a weld head assembly 28 as was above described with reference to FIGURE 1. The weld head assembly may be secured to the front face of the oscillator slide plate 30 in any suitable manner, such as by mounting bolts retained within apertures 100 provided in the oscillator plate.

The oscillator plate 30 is mounted on a ball screw shaft 102 and a shaft member 104 through a ball screw block 106 cooperatively associated with the ball screw shaft 102 in a conventional manner, and a pair of bushing support members 108 which are slidably supported by shaft member 104. The ball screw block 106 may be secured to the rear surface 110 of oscillator plate 30 by threaded bolts 112 so as to lie in a plane substantially normal to the oscillator plate 30 and screw shaft 102. The ball screw block 106 is adapted to receive and retain a conventional ball cage assembly, shown generally at 114, which receives the ball screw shaft 102 therethrough in drive relation such that rotational movement of the ball screw shaft 102 will effect movement of the ball cage assembly 114 and thus ball screw block 106 in a direction along the longitudinal axis of the ball screw shaft. The bushing support members 108 may be suitably secured to the rear surface 110 of oscillator plate 30 in any suitable manner, such as by welding as at 116. The bushing support members 108 receive the shaft member 104 in sliding relation therethrough such that when the oscillator slide plate 30 is moved by rotation of the ball screw shaft 102, the lower portion of the oscillator plate will be freely supported upon shaft 104 for sliding movement thereon. The ball screw shaft 102 and the shaft member 104 are supported in generally parallel planar relation by end plates 118 and 120 of a housing comprised of top and bottom plate members 122 and rear plate 124. The end plate members 118 and 120, top and bottom plate members 122 and rear plate member 124 are suitably secured together such as by machine screws or bolts 126 to form a housing for partially enclosing the shaft members 102 and 104. The ball screw shaft 102 is rotatably supported in bearing members 128 fixedly retained in the end plate members 118 and 120. The shaft member 104 is fixedly secured within apertures 130 provided in the end plates 118 and 120 by means of a set screw 132 engaging a flat portion 134 on the shaft member 104. Preferably, elasticone covers 136 and 138 are provided, respectively, on the ball screw shaft 102 and shaft member 104 to protect the respective shafts from dirt and dust accumulation thereon.

The ball screw shaft 102 includes an outer end portion 140 which has a gear member 142 suitably mounted thereon and retained in fixed rotational relation on the ball screw shaft through a key member 144 in a conventional manner. The gear 142 engages and is driven by a driving gear 146 which is fixedly secured to a drive shaft 148 of the synchronous electric stepping motor 64. The gear 142 may be given a smaller pitch diameter than drive gear 146 such that the gears provide a speed reduction means between the motor shaft 148 and the ball screw shaft 102. The stepping motor 64 is mounted on a support housing 152 through bolts or screws 154. The support housing 152 is in turn suitably secured to the outer surface of end member 120 and provides an enclosure for the speed reducing means comprised of gears 142 and 146.

The position follow-up potentiometer 70 is suitably secured to the inner surface of end member 120 in a position such that a center arm shaft 158 of the potentiometer is in axial alignment with the shaft 148 of the synchronous motor 64. The potentiometer center shaft 158 is connected to the motor shaft 148 through a coupling member 160 such that potentiometer shaft 158 will rotate with motor shaft 148. The position potentiometer 70 is of a conventional type and includes a center slide arm 164 (not shown) coupled to the center shaft 158 such that the slide arm will be located at the center position of the potentiometer coil when the oscillator plate 30 is at a position approximately half-way between the end plates 118 and 120.

Having thus described the elements comprising the slide assembly 20, it can be seen that when the synchronous stepping motor 64 is energized, the ball screw shaft 102 will be caused to rotate by virtue of the gears 142 and 146. The interconnection of the oscillator slide plate 30 to ball screw shaft 102 through the ball cage assembly 114 and ball screw block 106 will cause the oscillator slide block 130 to be moved in a direction dependent upon the thread direction of ball screw shaft 102 and its direction of rotation. Reversal of the stepping motor 64 will cause the oscillator slide plate 30 to correspondingly reverse its direction. Thus, periodic reversal of the rotation of stepping motor 64 will cause the slide plate 30 to oscillate along the longitudinal axis of ball screw shaft 102.

SPECIFIC DESCRIPTION OF THE OSCILLATOR SLIDE ASSEMBLY CONTROL CIRCUIT

Figure 6:
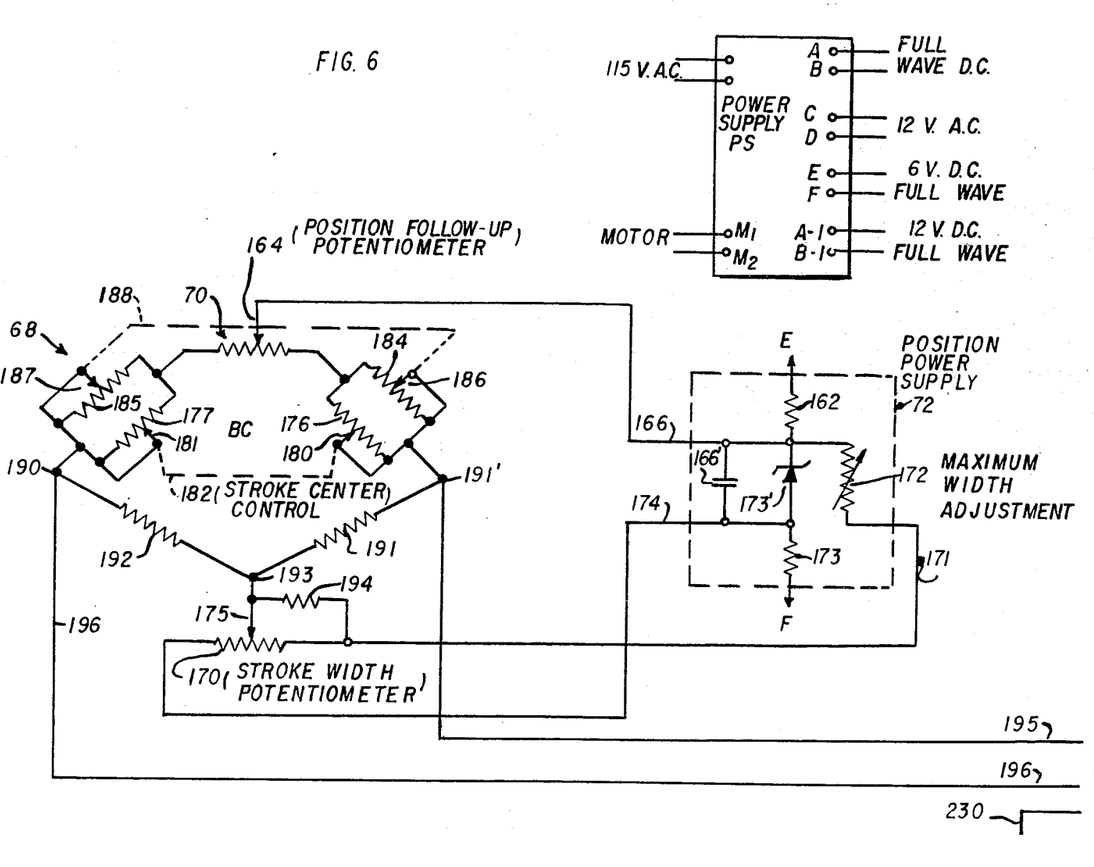
FIGURES 6–10 illustrate the oscillator control circuit used in conjunction with the oscillator slide assembly illustrated in FIGURES 1 and 3–5.

As shown in FIGURE 6, the power source for the system comprises a supply PS which is energized from a conventional 115 volt AC source, and includes means for providing a twelve volt full wave rectified DC current output over a first set of terminals A, B; a twelve volt AC supply over a second set of terminals C, D; a full wave DC output current over a third set of terminals E, F; a twelve volt full wave rectified DC current over a fourth set of terminals A1, B1 as a supplement to the output power provided by the first terminals A, B; and the necessary power inputs for the stepping motor over a fifth set of terminals $M_1$–$M_2$.

FUNCTION OF CONTROL CIRCUIT

As noted heretofore the control circuit shown in FIGURES 6–10 is operative to control a stepping motor 64 in the drive of a mechanical slide 30 which may support arc welding equipment for controlled linear (straight line) oscillatory motion. In achieving such control, the circuit includes width control means 170 (FIG. 6) for adjusting (during or before operation) the extent or limits of the slide motion, speed control means 86 (FIG. 10) for adjusting the traverse speed of the slide travel, and dwell timer means 250, 298 (FIGS. 9, 8) for adjusting the dwell time or length of time the slide pauses at the end of its excursion to a preset limit prior to reversal and movement in the opposite direction. The system also includes adjustable means 182, 188 for changing the mean center line of the oscillatory motion within the capability of the mechanical slide.

A selector switch 46, having a contact arm 292 (FIG. 8), permits the operator to select manual operation or automatic operation of the slide oscillation. In the off position, the slide is stopped in position and locked electronically. In the automatic position of contact arm 292, the slide is positioned to the extreme left excursion of the oscillatory motion and a remote external signal is then used to operate an auto start relay ASR (not shown) which closes contacts ASR3 to start and stop the oscillatory motion.

OSCILLATOR POSITION CONTROL

With reference to FIGURE 6, the oscillator position control circuit 68 is shown as including a separate position power supply 72 for providing stable reference voltages to a bridge circuit BC over the slide arm 164 of the position potentiometer 70 and the adjustable width potentiometer means 170.

The position power supply 72 basically comprises a pair of input leads connected to terminals E, F of the system power supply PS. A series circuit comprised of a first resistor 162, a Zener diode 173' and a resistor 173 is connected between the input leads to taps E and F of the power supply. A pair of output conductors 166 and 174 are connected across the Zener diode 173' to provide a constant reference voltage for the bridge circuit BC as will be shown, the positive potential terminal being connected to the slide arm 164 and the negative terminal being connected to one end of the adjustable width potentiometer means 170. The second end of width potentiometer 170 is connected over a conductor 171 and a maximum width adjustable potentiometer 172 to the positive potential terminal in the position power supply 72. Arm 175 on potentiometer 170 is connected to the negative input terminal 193 of the bridge, adjustment of the arm to different positions effecting a corresponding variation in the voltage signal supplied to bridge terminal 193. The negative voltage provided to the bridge circuit is prevented from reaching zero potential by a resistor 194 connected between the input terminal 193 and conductor 171. A series connected internal potentiometer 172 in the position power supply 72 provides a further means to control the negative voltage to the bridge circuit from potentiometer 170. A capacitor 166' is connected across the output conductors 166, 174 for filtering purposes.

The bridge circuit BC as shown comprises a first leg including resistance 191 and a second leg including resistance 192 the junction of which is connected to the negative input terminal 193. The third leg includes a pair of parallel connected adjustable resistors 177, 185 connected between a bridge output terminal 190 and over the end of the position follow-up potentiometer 70. The fourth leg includes a pair of parallel connected adjustable resistors 176, 184 connected between the second bridge output terminal 191' and the other end of position follow-up potentiometer 70. The adjustable arm 164 of the position follow-up potentiometer 70 is connected over conductor 166 to the positive terminal of the power supply 72 and, as noted above, is mounted for movement with the slide plate 30 to vary the resistance connected in the third and fourth legs. With the slide plate 30 in the midposition of its capable range, the resistance of potentiometer 70 is equally divided in the third and fourth legs.

Assuming the adjustable arms 180, 181, 186 and 187 of the resistors 176, 177, 184 and 185, respectively, are set for operation of the slide 30 about the mean center of its capable travel range, when the arm 164 is in the position shown in FIGURE 6 one half of resistor 70 is inserted in the third leg and the other half is connected in the fourth leg and the difference between the voltages at the bridge output terminals 190, 191' will be zero.

When the arm 164 is moved to the right as a result of movement of the slide plate 30, the resistance in the third leg is increased and the resistance in the fourth leg is decreased, thereby causing the value of the voltage on an output conductor 195 to increase, and the value of the voltage on a conductor 196 to decrease. In a similar manner, if the arm 164 is moved to the left, the value of the voltages on conductor 196 will increase and the value of the voltage on conductor 195 will decrease. Stated in another manner, when the slide arm 164 is moved from center position (and with the assumed settings of arms 180, 181, 186, 187) one of the pair of conductors 195, 196 will be positive relative to the other, and movement of the arm 164 through its center position will reverse the relative polarities of the conductors.

The mean center control 182 is connected to the adjustable arms 181, 180 on resistances 177, 176, respectively, located at either end of the position potentiometer 70, such that as the control 182 is manually rotated through the control button 48 (FIGURE 1) the resistance in one bridge leg is increased while the resistance in the other leg is decreased. In this manner, the electrical mean center position of the slide plate oscillation will be changed to operate about a correspondingly different point and the zero difference output of the signals on conductors 195, 196 will occur at a point on the potentiometer resistor 70 other than when at the midpoint as shown in FIGURE 6.

The maximum center adjustment means 188 is connected to adjustable arms 186 and 187 on resistors 184, 185 in the third and fourth bridge legs, respectively, and is so connected that as it is rotated by means of a switch (not shown in FIGURE 1), the shunt resistance connected across the center control resistors 176, 177 in the third and fourth legs is varied in equal amounts. By varying shunt resistance in this manner, the effective value of the center position control 182 is reduced or increased, and accordingly the center position control can be modified to allow a small centering displacement or large centering displacement to occur when the center control 182 is adjusted, the nature of the displacement being determined by the setting of maximum adjustment means 188.

As noted above, the width potentiometer 170 provides the negative potential input to the bridge and the adjustable arm 164 provides the positive potential input. By adjusting the width potentiometer 170, the difference of the voltage fed to the bridge input terminals by potentiometer 170 and arm 164 (and therefore the voltage fed to the bridge) can be varied to different values. As will be shown, the control circuitry will effect slide reversal when the voltage on conductor 195 or 196 reaches a predetermined value. It will be apparent then that the lower the input voltage applied to the bridge input terminals by potentiometer 170 and arm 164, the further the slide must move before the signals on conductors 195, 196 reach the value at which slide reversal occurs.

Thus, it will be seen that the output voltage which appears at the bridge output terminals 190, 191' and on conductors 195, 196 is the result of all of the bridge potentiometer settings 70, 176, 177, 184, 185 as well as the setting of the width potentiometer 170.

TRIGGER CIRCUIT

Figure 7:
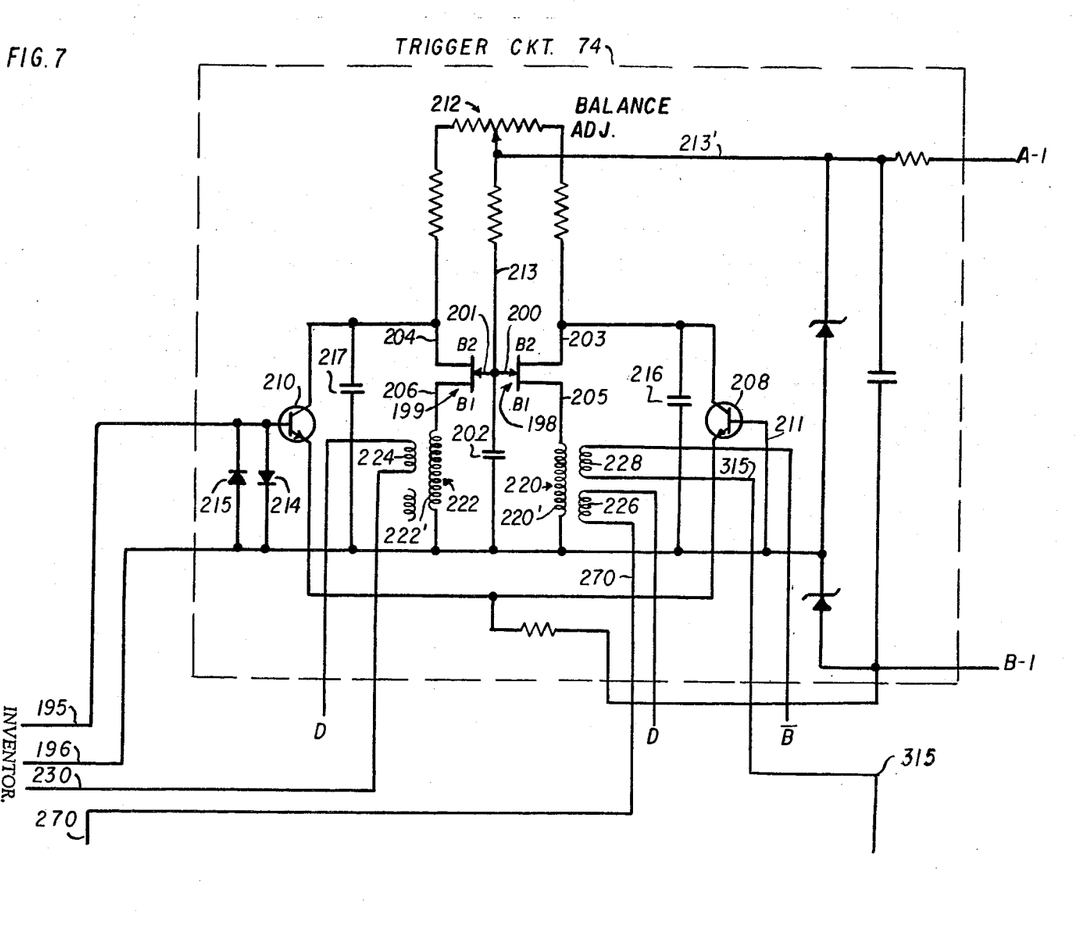

The voltage signals on output conductors 195, 196 from the bridge circuit BC in the oscillator position control 68 are coupled to the input circuit of a trigger circuit 74. As was noted above, the trigger circuit 74 has a predetermined threshold value and when the signals on either conductor 195 or 196 reach the threshold voltage of the trigger circuit, a train of command pulses is generated and transmitted over output conductors 270, 315 or over output conductor 230 to terminate movement of the oscillator slide 30 and, after a predetermined measured dwell period to effect reversal of the slide motion.

Referring to FIGURE 7, the trigger circuit 74 basically comprises a pair of transistors 210, 208 connected as a differential amplifier circuit to conductors 195 and 196 so as to be responsive to the input signals from the bridge circuit BC in the oscillator position control 68. A pair of unijunctions 198, 199 are in turn controlled by transistors 208, 210 to selectively provide trains of command pulses over output conductors 230, 270 and 315 to the trigger relay circuits 76, 78.

Each of the unijunctions 198 and 199 has an emitter 200 and 201, respectively, which emitters are connected to a common timing capacitor 202 which is further connected to the input conductor 196. Capacitor 202 is operative with each unijunction 198, 199 as energized to provide a series of pulses for control purposes as will be shown. Each of the unijunctions 198 and 199 further includes a base-one terminal (B1) connected over conductors 205 and 206, respectively, over the primary windings of pulse transformers 220, 222, respectively, to conductor 196, and a base-two terminal (B2) connected over conductors 203 and 204, respectively, over a balance potentiometer 212 and a conductor 213' to the positive terminal A-1 of the power source.

The two transistors 208 and 210 in the differential amplifier circuit are of the NPN type which have their collector outputs connected to the base-two terminals B2 of the unijunctions 198 and 199 via conductors 203 and 204, respectively. The transistor 208 has its base connected over conductor 211 to the input conductor 196 and the transistor 210 has its base connected to input conductor 195. As will be shown, when the output signals from the oscillator position control 68 on conductor 195 or 196 exceed the threshold voltage of transistors 208 or 210 of the differential amplifier circuit, such transistor (208 or 210 as the case may be) will conduct.

As one of the transistors 208 or 210 conducts, it will lower the interbase voltage of its respective unijunction below the peak point voltage on the common capacitor 202, and the unijunction having its interbase voltage so lowered is in a condition to produce a rapid series of pulses in the primary winding of the pulse transformer 220 or 222 connected in its output circuit.

By way of brief example, if the slide plate 30 moves to the left hand limit of the set pattern of travel, the input signal on the conductor 196 controls transistor 208 to conduct, and the interbase voltage of unijunction 198 will fall below the peak point voltage of capacitor 202 to place the unijunction 198 in condition to produce a rapid series of pulses over conductor 205 and windings 226 and 228. Once the unijunction 198 has reached this state, it will remain so (even if the input signal is removed) until the unijunction 199 is conditioned by transistor 210 as the result of the bridge output as the slide moves to the right hand limit of its travel. It will be understood that the circuit components are connected and the values are selected so that only one unijunction can be in a conductive state at one time.

The pulse output of the particular one of the unijunctions 198, 199 which is conditioned for pulse generation is basically achieved by the full wave rectified DC current input over conductor 213' which is fed over the balance adjusting potentiometer circuit 212 to the base-emitter circuits of the unijunctions 198, 199. That is, the varying DC input to the base emitter circuit of the one of the unijunctions which has been conditioned results in the on-off cycling of the conditioned one of the unijunctions at a rapid rate. During each off period of the effective unijunctions, capacitor 202 charges from the source A–1 and during the conducting period of the unijunction, the capacitor discharges over the pulse transformer winding connected in its base circuit. Pulse generation is continuous in such manner during the period that the unijunction 198 or 199 is so conditioned by its associated transistor 208 or 210 as the case may be.

The pulse output of the right hand unijunction 199 is fed to the primary winding 222' of the pulse transformer 222 and the pulse output of the left hand unijunction is fed to the primary winding 220' of the pulse transformer 220 having two secondary windings 226, 228. The pulse transformers 220, 222 serve to isolate the trigger circuit 74 from the control circuits for the trigger relays. The function of the pulse transformers will be described more fully hereinafter.

Balance adjust potentiometer 212 permits compensation for variations in the values of the components in the oscillator slide assembly control circuit 68. The balance adjust potentiometer 212 further provides a means of adjusting the trigger circuit 74 so that the switching or flip-flop action between unijunctions 198 and 199 takes place at points of equal potential on either side of the zero voltage point of the input signals on conductors 195, 196 from the oscillator position control 68.

Two diodes 214 and 215 are coupled across the input signal conductors 195 and 196 in such a manner that the input voltage cannot exceed the conductive voltages of either of the respective diodes 214 or 215. If the input signal exceeds the minimum conductive voltage of either of the diodes 214 or 215, that diode will conduct across conductors 195 and 196 to shunt the voltage safely across the input until it has reached a safe value, or until it has been lowered by proper motion of the oscillator slide 30 to bring the bridge circuit BC into balance.

A pair of capacitors 216 and 217 are connected, respectively, across the unijunction base-two terminals (B2) via conductors 203 and 204, and the collector outputs of the transistors 208, 210 respectively. The capacitors 216 and 217 are connected to prevent one unijunction from conducting by itself when its related associated differential amplifier transistor is set in the off condition.

Summarizing, it will be seen that the trigger circuit 74 is controlled by the input signals over the conductors 195, 196 from the oscillator position control circuit 68 to provide command pulses over a left hand pulse transformer 220 or a right hand pulse transformer 222 whenever the oscillator slide plate 30 reaches the preset limit of its travel in either direction.

RIGHT-HAND TRIGGER RELAY CIRCUIT

Figure 8:
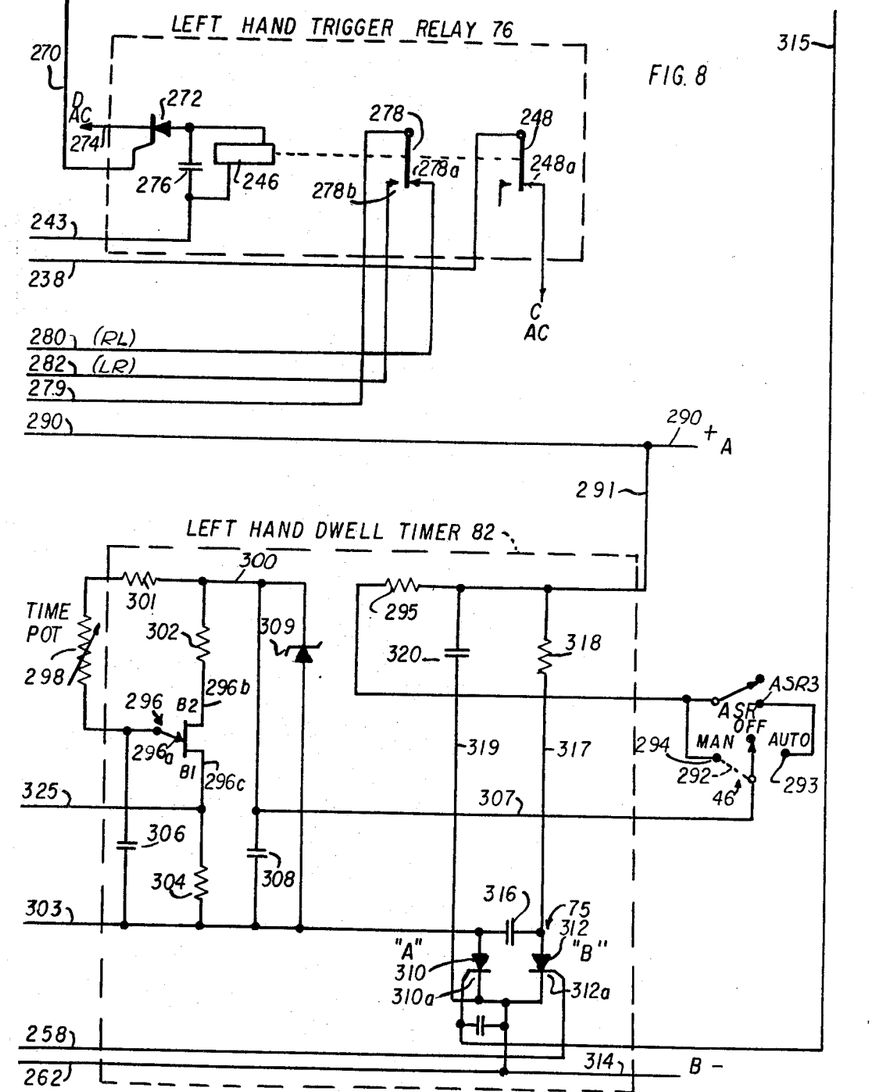
Figure 9:
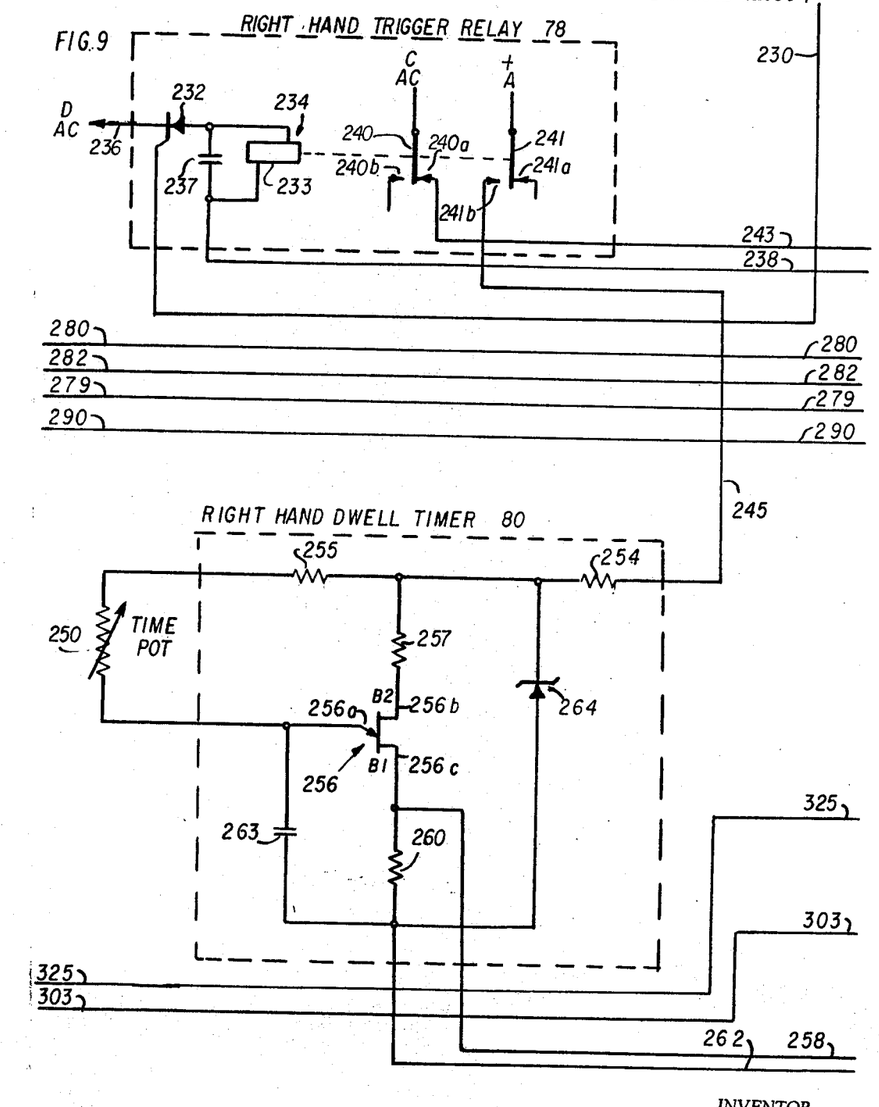

The command pulses from the right hand pulse transformer 222 in the trigger circuit 74 are transmitted over a conductor 230 to the RHTR circuit 78 (FIG. 9) and specifically to the gate of a silicon controlled rectifier 232 which is connected in series with a coil 233 of a direct current relay, shown generally at 234 in FIGURE 9. Relay 234 is connected over a conductor 238 and contacts 248 in the LHTR 76 (FIGURE 8) to one terminal C of the terminal pair CD in the system power supply PS, and over the silicon controlled rectifier 232 and a conductor 236 to the second terminal D of such pair. Terminals CD provide a 12 volt AC output, and the silicon controlled rectifier 232 when conducting provides half-wave rectification of the AC voltage supplied over such circuit. Thus, when a series of rapid command pulses from the pulse transformer 222 of trigger circuit 74 are applied to the gate of the silicon controlled rectifier 232 (and assuming the LHTR 76 is restored) the rectifier 232 will conduct on every half cycle of the AC voltage applied over conductor 236. A capacitor 237 is coupled across the relay 234 and discharges through the coil 233 during the non-conducting half cycles of the rectifier 232 to thereby maintain the coil 233 in an energized state during such periods.

Relay 234 has a first contact set 240a which normally prepares an energizing circuit from terminal C of the power supply PS to a relay 246 in the LHTR 76 (i.e., when the relay is restored), and which opens such circuit when the relay 234 is energized, and a second contact set 241b for energizing the RHDT circuit 80 when relay 234 is energized. Thus, when command pulses from the trigger circuit 74 are applied to the gate of rectifier 232 for relay 234 in the RHTR circuit 78, relay 234 operates and its contact set 240a opens the energizing circuit for the relay 246 in the LHTR circuit 76, and a second set of contacts 241b connects a 12 volt DC control signal from positive terminal A on the power supply PS to the RHDT circuit 80.

LEFT-HAND TRIGGER RELAY CIRCUIT

The LHTR circuit 76, as shown in FIGURE 8, is controlled by command pulses received over input conductor 270 from the trigger circuit 74. The command pulses so received are applied to the gate of a silicon controlled rectifier 272 which is connected in series with the coil of the direct current relay 246, and the contact set 240a in the RHTR circuit 78 to the 12 volt AC terminals CD of power supply PS.

Relay 246 is energized in substantially the same manner as relay 234 of the RHTR circuit 78 in that when a command pulse from the trigger circuit 74 is applied to the gate of rectifier 272 (and assuming the corresponding relay 234 in the RHTR circuit 78 is restored), the rectifier 272 will conduct on every half cycle of the AC voltage applied over conductors 243, 274. A capacitor 276 is coupled across the coil of relay 246 to maintain the relay winding energized during the alternate half cycles.

Relay 246 has a first contact set 248 for normally completing the energizing circuit to the RHTR circuit 78 as described heretofore, and a second contact set 278a, 278b for selectively connecting an energizing circuit to one of two alternate circuits RL, LR for the motor control circuit 84. The energizing circuit extends from a terminal W of a motor terminal box 340 (FIGURE 10) over speed potentiometer 86, conductor 279 to the contacts 278a, 278b for selective connection to the RL and LR conductors 280 and 282, respectively. As will be shown, during movement of the slide plate 30 in one direction the closed one of the contact sets 278a, 278b is effective to maintain the energizing circuit for the motor. However, as the slide plate 30 reaches the preset limit of travel the closed one of the contacts 278a, 278b is opened to stop motor rotation and the other contact is closed to prepare the alternate motor energizing circuit which however is interrupted at such time by an open contact in motor control circuit 84 as will become more apparent hereinbelow. After a dwell period which is determined by the dwell timer circuits 80, 82, the motor circuit 84 completes the alternate motor circuit and restarts the motor in the reverse direction. It will be apparent therefrom that the LHTR circuit 76 will stop the motor whenever the slide 30 moves to either of its preset limits by opening the effective one of the contacts 278a, 278b.

DWELL TIMERS

(a) Right hand dwell timer

As was described briefly above, the right and left hand dwell timer circuits (RHDT and LHDT) 80 and 82, respectively, serve to selectively measure a dwell period at the end of each stroke of the oscillator slide plate 30. The RHDT circuit 80 comprises a basic unijunction trigger circuit which receives an input signal over conductor 245 from the RHTR circuit 78. Such signal occurs whenever the relay 234 in the RHTR 78 is energized by the trigger circuit 74 in response to movement of the slide plate 30 to the right hand limit of its travel. RHDT circuit 80 includes a unijunction 256 having an emitter 256a and base elements B1, B2. The base B2 is connected over conductor 256b and resistor 257 to the conductor 245 and the base B1 is connected over conductor 256c, a resistor 260 and conductors 262, 314 to the negative tap B of the full wave DC rectified output of the power supply PS. A manually adjustable timing potentiometer 250 is coupled to the emitter 256a of unijunction 256 and to a capacitor 263 to provide a charging path for capacitor 263. The charging path extends from the input conductor 245 (when energized by positive potential) over resistors 254, 255 and 250 to capacitor 263 and conductor 262, 314 to the negative potential tap B. A Zener diode 264 is coupled between the ground conductor 262 and the input conductor 245 to provide a stable reference voltage for the timer circuit 80.

The timing components of the RHDT circuit 80 operate in a well known manner. When the power is applied from terminal A over contacts 241b, conductor 245, resistors 254, 255 and 250, the capacitor 263, conductors 262, 314 to the B terminal, capacitor 263 will charge. As the voltage on capacitor 263 and emitter 256a reaches the peak voltage of the unijunction 256, the capacitor 263 will discharge over emitter 256, base B1 and resistor 260 to negative conductors 262, 314 and thereby provide an output signal over conductor 258 to control circuit 75. The time delay between the time of connection of the power source A to the RHDT circuit 80 by RHTR 78 and the provision of the output signal over conductor 258 to the control circuit 75 is determined by the charging rate of the RC circuit 250, 263 which may be varied by means of the manually adjustable potentiometer 250. As will be shown, such signal will result in start of the motor to drive the slide 30 from right to left.

(b) Left hand dwell timer circuit

The LHDT circuit 82 is selectively enabled by the trigger circuit 74 and control circuit 75 as the slide plate 30 reaches the left hand limit of travel, and is operative to measure a predetermined dwell period and to provide a signal which enables the stepping motor 64 to drive the slide from left to right.

The LHDT circuit 82 comprises a trigger circuit somewhat similar to that of the RHDT circuit 80. The switch means 46 which was generally described above with reference to FIGURE 1, includes a contact arm 292 which is movable from an off position into engagement with either a contact 293 for automatic control or a contact 294 for manual control. For purposes of this description, the switch 46 will be described as having the contact arm 292 coupled to the contact 294 which allows the control circuit to function without remote control equipment. With the switch in such position the full wave direct current supplied over terminal A to conductor 290 is fed via a conductor 291, a resistor 295, the contact arm 292 and conductor 307 to provide positive potential for the dwell timer circuit 82. A Zener 309 is connected between a positive conductor 300 and a negative conductor 303 to provide a stable reference voltage for the circuit, and a capacitor 308 is connected across conductors 300, 303 to filter the input voltages.

The trigger circuit portion of the LHDT circuit 82 comprises a unijunction 296, having an emitter 296a and a base B2 connected over a conductor 296b and a resistor 302 to the positive potential on conductor 300, and a base B1 connected over a resistor 304 to the conductor 303. A manually adjustable timing potentiometer 298 is coupled over the emitter 296a and a resistor 301 to the positive potential conductor 300 to provide a charging circuit for a capacitor 306 which is coupled across the unijunction emitter 296a and the resistor 304.

CONTROL CIRCUIT

The conductor 303 is connected over a silicon controlled rectifier 310 to negative potential, such connection being effected only during the period of gating of the silicon controlled rectifier 310 by a pulse train from the trigger circuit 74 via conductor 315 to the gate 310a. Once the rectifier 310 is caused to conduct, it will remain conductive by reason of the full wave direct current on conductors 290, 314. As the rectifier 310 conductors, a measured time period occurs during which the capacitor 306 charges from positive potential fed over conductors 290, 291, resistor 295, contact 294, switch arm 292, conductors 307, 300, resistor 301, the timing potentiometer 298, capacitor 306, conductor 303, silicon controlled rectifier 310 and conductor 314 to negative potential on terminal B.

When the voltage of emitter 296a reaches the peak point voltage of the unijunction 296, the capacitor 306 discharges over the emitter base B1 path of the unijunc- 296 and resistor 304 to conductor 303 to thereby produce an output signal over a conductor 325.

A capacitor 316 is coupled between the anodes of the silicon controlled rectifier 310 and a second silicon controlled rectifier 312 and is charged to the voltage on conductor 290 during the period silicon controlled rectifier 310 is conducting. The second silicon controlled rectifier 312 is turned on by a signal to gate 312a over the conductor 258 from the dwell circuit 80 whenever the slide plate 30 moves to the right hand limit of travel. However, since capacitor 316 is charged to a voltage determined by source A, B, and a resistor 318 during the period silicon controlled rectifier 310 conducts, (i.e., during the period that the slide is moving from left to right) the conduction of rectifier 312 as the slide reaches its right hand limit will discharge capacitor 316 to back bias silicon controlled rectifier 310 and place silicon controlled rectifier 310 in a blocking state. The silicon controlled rectifier 312 does not remain in the conducting state as the resistor 318 keeps the current below the holding current requirements for the rectifier 312.

As will now be shown, during the period the silicon controlled rectifier 310 conducts (slide movement left to right) a circuit is completed for motor control relay circuit 84, and during the period silicon controlled rectifier 312 is effective (slide movement right to left) the silicon controlled rectifier 310 is turned off to interrupt such circuit.

MOTOR CONTROL RELAY CIRCUIT

Figure 10:
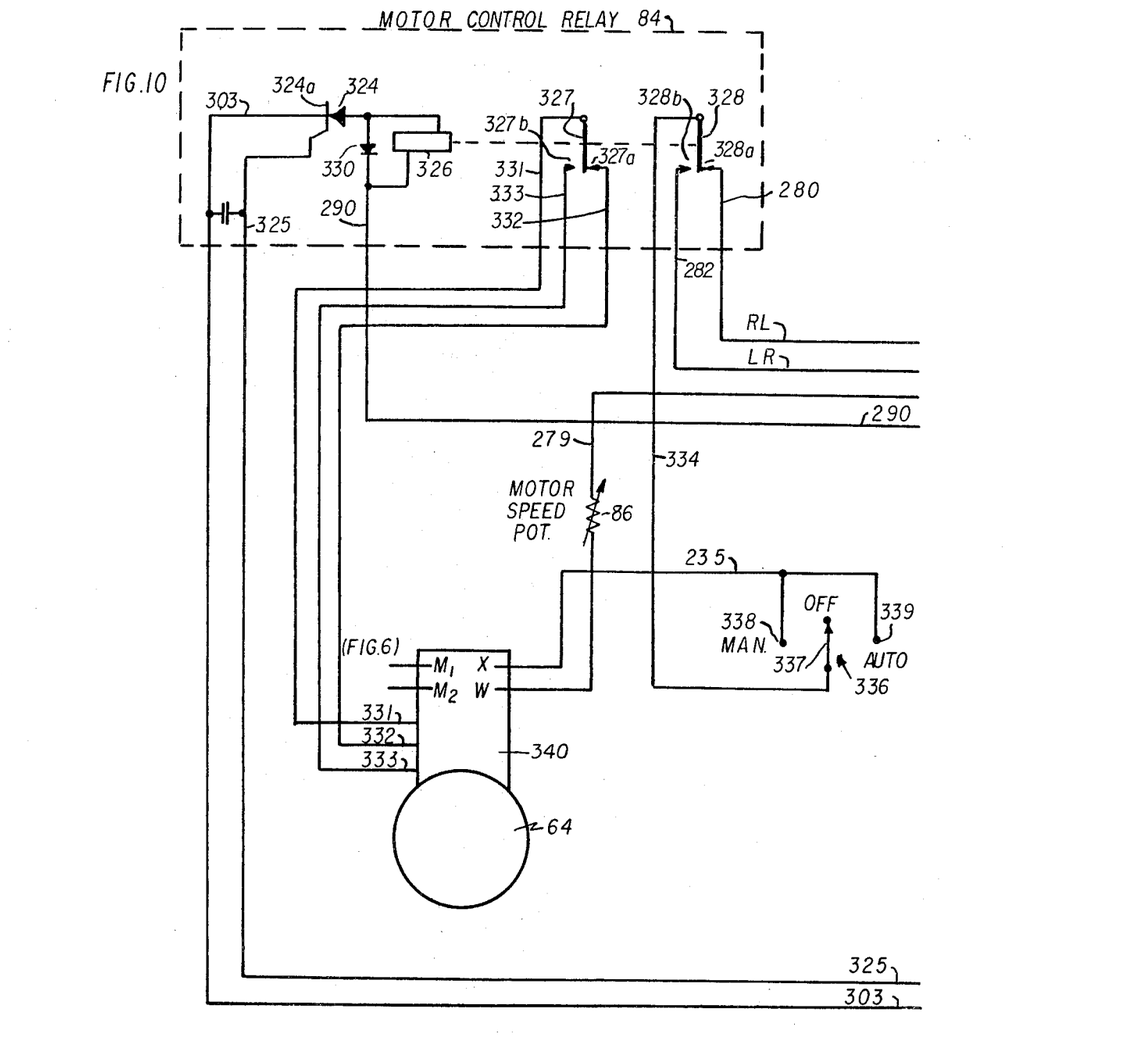

Referring now to FIGURE 10, the signal output provided by the unijunction trigger circuit in the LHDT circuit 82 when the slide plate 30 moves to its left hand limit of travel is coupled over conductor 325 to the gate 324a of a silicon controlled rectifier 324. The rectifier 324 is connected in series with a relay coil 326 in the motor control relay circuit 84, and, when conductive, controls energization of the relay 326.

Briefly, when the silicon controlled rectifier 324 is gated to conductivity by the signals over conductor 325 as the slide 30 reaches its left hand travel limit, the relay 326 is energized by alternate half cycles of the current provided by rectifier 324 over the circuit extending from positive potential on conductor 290 (terminal A) over relay 326, silicon controlled rectifier 324, conductor 303, silicon controlled rectifier 310, and conductor 314 to negative potential (terminal B).

Relay 326, once energized by the pulse on conductor 325, will be held energized until the described circuit is interrupted by blocking of silicon controlled rectifier 310.

Relay 326 includes contacts 327a, 327b to control connection of the energizing circuit 331 for the motor windings, alternatively to either of control conductors 332 and 333; and includes contacts 328a, 328b to control shifting of the motor energizing circuit between the two alternate circuits 280, 282 which shifting occurs after the expiration of the aforedescribed measured dwell periods as will be shown.

A switch means 336 is disposed in the motor energizing circuit and includes a movable contact arm 337 which is mechanically interlinked to the control switch 46 shown on the control panel 44 of FIGURE 1. Switch 46 may be operated to adjust the movable contact arm 337 to connect contact 338 for manual control or to connect contact 339 for automatic control of the motor. The control switch 46 is operative to adjust both the contact arm 292 as above described, and contact arm 337 of switch means 336.

The conventional stepping motor 64 is indicated schematically along with terminal box 340. The terminal box 340 includes suitable terminals $x$ and $w$ for connecting the armature winding of the stepping motor in circuit with the energizing circuit conductors 235 and 279, respectively, and the power inputs $M_1$–$M_2$ from the power source PS (FIGURE 6). The terminal box 340 also serves to connect the stepping motor field winding over the power input conductors $M_1$–$M_2$ and the conductors 332 and 333 to the motor control relay 84 so as to allow selective reversal of rotation of the stepping motor in the manner described.

CIRCUIT OPERATION

With reference to the foregoing descriptions of the oscillator positioner control circuit 68, the trigger circuit 74, the RHTR circuit 76, the LHTR circuit 78, the RHDT circuit 80, the LHDT circuit 82, the control circuit 75 and the motor control relay 84, the operation of the system is as follows. Assume, for purposes of explanation, that the stepping motor 64 is rotating in such a direction that the oscillator slide plate 30 is moving toward the left, as viewed in FIGURE 3. In such event the trigger circuit 74 will be transmitting command pulses over conductor 230 to maintain relay 234 in the RHTR 78 operated. Relay 234 at its contacts 240a interrupts the operating circuit for relay 246 on the LHTR 76 to effect lockout thereof. In the control circuit 75, silicon controlled rectifiers 310 and 312 will be nonconducting, and relay 326 in the motor control relay circuit 84 will be restored. With relay 326 restored, contacts 327a are closed and the stepping motor 64 rotates to move the slide from right to left; and contacts 328a are closed to complete the RL energizing circuit for the stepping motor 64 which extends from the terminal W of the motor terminal box 340 motor speed control potentiometer 86, conductor 279, contacts 278a, conductor 280, contacts 328a, conductor 334, arm 337 and contacts 338 of switch 236, and the conductor 235 to motor terminal X.

As the oscillator slide plate 30 approaches the left hand limit of its travel, which limit has been preset by the width potentiometer 170 relative to a stroke center position determined by the settings of the mean center and maximum center controls 182, 188, the arm 164 on the position follow-up potentiometer 70 reaches the point at which the bridge circuit BC provides an increasingly more positive output signal on conductor 196 to the trigger circuit 74. As the threshold voltage of the trigger circuit 74 is reached, transistor 208 conducts and unijunction 198 and capacitor 202 thereupon operate to generate a series of pulses which are coupled over the primary winding 220′ of pulse transformer 220 and thereby over (a) secondary winding 226 and conductor 270 to the gate of the silicon controlled rectifier 272 of the LHTR circuit 76, and (b) secondary winding 228 and conductor 315 to the gate 310a of the silicon controlled rectifier 310 in the LHDT circuit 82.

In the LHTR circuit 76, relay 246 operates when the rectifier 272 is turned on and at its contacts 278a interrupts the RL energizing circuit to the stepping motor 64, and at its contacts 278b prepares the LR circuit over conductor 282 for the stepping motor 64 (i.e., the LR circuit moves the slide from the left to the right), which circuit is interrupted by reason of the fact that the control relay 84 is restored.

At the same time, the command pulses from the trigger circuit 74 are applied to the gate 310a of the rectifier 310 in the LHDT circuit 82 and rectifier 310 conducts and will remain in the conducting state even after the command pulses from the trigger circuit cease. Conduction of the rectifier 310 completes the charging circuit for capacitor 306 which extends from positive potential on conductor 290, over resistor 295, contacts 294, switch arm 292, conductors 307, 300, resistors 301, timing potentiometer 298, capacitor 306, conductor 303, silicon controlled rectifier 310 and conductor 314 to the negative terminal B on the power supply PS.

After a time delay, the length of which is determined by the setting on the timing potentiometer 298, unijunction 296 conducts and a control signal is transmitted over the output conductor 325 to the gate 324a of the rectifier 324 in the motor control relay circuit 84. The silicon controlled rectifier 324 conducts, and relay 326 is energized over the circuit extending from positive potential on conductor 290 over relay 326, rectifier 324, conductor 303, silicon controlled rectifier 310 and conductor 314 to negative potential. Relay 326 remains energized until this circuit is interrupted.

Relay 326 in operating is effective at its contacts 327b to shift the direction of current flow in the motor winding to move the slide from left to right by connecting conductor 331 to conductor 333, and at its contacts 328b completes the LR energizing circuit to the motor terminals W, X which extends from terminal W over motor speed control 86, conductor 279, contacts 278b, conductor 282, contacts 328b, conductor 334, switch arm 337, contacts 338 and conductor 335 to terminal X.

Thus, the motor 64 has been stopped as the preset end limit of travel of the slide plate 30 (from right to left) is reached, a delay period has been measured and the motor has been reversed to move the slide from left to right. Relay 326 is held operated during the period of travel of the slide from left to right by the conducting silicon controlled rectifier 310.

As the oscillator slide plate 30 approaches its right hand end limit, the output signal from bridge BC on conductor 195 reaches a positive value which causes transistor 210 to conduct which in turn effects cutoff of transistor 208. Unijunction 199 operates with capacitor 202 to provide a train of pulses over pulse transformer 222 to the RHTR circuit 78 and simultaneously unijunction 198 is disabled to terminate the pulse train to the LHTR circuit 76 and to the gate 310a of the silicon controlled rectifier 310 in control circuit 75.

As the pulse train to the LHTR 76 is terminated, relay 246 restores, and at its contacts 278b interrupts the energizing circuit for the motor 64 which stops further movement of the slide toward the right; at its contacts 278a, relay 246 prepares the RL motor energizing circuit (which is interrupted by open contacts 328a in the motor control relay circuit 84).

As the RHTR circuit 78 receives the train of pulses over conductor 230 from the trigger circuit 74 (and after relay 246 restores by reason of the termination of the pulses over conductor 270 from trigger circuit 74), relay 234 operates and at its contacts 240a opens the circuit to the LHTR relay 246 to prevent reoperation of relay 246. At its contacts 241b, relay 234 provides full wave rectified DC current over conductor 245 to the RHDT circuit 80, which operates in the manner described heretofore to measure a predetermined time period and thereafter transmit an output signal over conductor 258 to the gate 312a of the silicon controlled rectifier 312.

Rectifier 312 is thereupon triggered into conduction and causes the capacitor 316, which has previously been charged to the voltage determined by resistance 318 and the voltage on conductor 290, to discharge rapidly through rectifier 312 thereby back biasing rectifier 310 for a sufficient time to allow the rectifier 310 to recover to a blocking state.

As the rectifier 310 blocks, the circuit through the motor control relay 84 is interrupted. Relay 326 thereupon restores and at its contacts 327a transfers the conductor 331 to conductor 332 to reverse the stepping motor 64 to move the slide plate 30 from right to left, and at its contacts 328a completes the RL energizing circuit for the stepping motor. As noted above, the rectifier 312 will not remain in a conducting state as the resistor 318 in series with the rectifier diode is selected to keep the current below the holding current requirements for the rectifier 312.

While a preferred embodiment of my invention has been shown and described, it will be obvious to those skilled in the art that changes and modifications may be made therein without departing from the invention in its broader aspects, and therefore, the appended claims are intended to cover all such changes and modifications as fall within the true spirit and scope of my invention.

What is claimed is:

1. In a welding machine, an oscillator slide assembly and control circuit for effecting oscillatory motion of an oscillator slide plate, comprising, in combination, means for supporting the oscillator slide plate for rectilinear oscillatory motion, primary motion actuator means including an electric stepping motor operatively associated with the oscillator slide plate and including means for selectively effecting constant adjustable rectilinear oscillatory motion of said plate, and means for controlling said primary motion actuator including: oscillator plate position control circuit means responsive to the position of the oscillator slide plate to produce output signals in direct relation to the position of the slide plate during oscillation thereof, circuit means responsive to said output signals to provide command pulses, and means including a motor control relay circuit responsive to said command pulses and coupled to said primary motion actuator, said command pulse responsive means establishing output signals to effect selected motion of said primary motion actuator in a first direction and reverse the direction of said actuator and thereby reverse the direction of motion of the slide plate.

2. An oscillator slide assembly and control circuit as defined in claim 1 wherein said electric stepping motor is normally electrically locked in place and operable upon receipt of an output signal from said command pulse responsive means, and wherein said support means includes a ball screw shaft arrangement interconnecting the oscillator slide plate and said stepping motor whereby rotary motion of said stepping motor effects rotation of said ball screw shaft and rectilinear motion of the slide plate in a direction along the longitudinal axis of said screw plate.

3. A device as defined in claim 1 wherein said means responsive to the position of the oscillator slide plate to produce output signals comprises a position control circuit including position follow-up potentiometer means operatively associated with said primary motion actuator such that said position control circuit produces output signals dependent upon said follow-up potentiometer.

4. A device as defined in claim 3 wherein said position control circuit includes potentiometer means for controlling the length of the slide plate stroke during oscillation thereof.

5. A device as defined in claim 3 wherein said position control circuit includes means for adjusting the mean center of the slide plate stroke to different positions during oscillation of the slide plate.

6. A device as defined in claim 3 wherein said position control circuit further includes a bridge circuit including said position follow-up potentiometer and a potentiometer means for controlling the input voltage to said bridge circuit to thereby control the length of the slide plate stroke, said bridge circuit being adapted to produce a command signal dependent upon the relative position of the slide plate during oscillation thereof.

7. In a welding machine, an oscillator slide assembly and control circuit for effecting oscillatory motion of an oscillator slide plate, comprising, in combination, means for supporting the oscillator slide plate for rectilinear oscillatory motion, primary motion actuator means operatively associated with the oscillator slide plate and including means for selectively effecting constant adjustable rectilinear oscillatory motion of said plate, and means for controlling said primary motion actuator including: oscillator plate position control circuit means responsive to the position of the oscillator slide plate to produce output signals in direct relation to the position of the slide plate during oscillation thereof, circuit means comprising a trigger circuit responsive to said output signals and including means for providing first and second command pulses, said first command pulse being produced when said trigger circuit receives a first predetermined signal of a given value and said second command pulse being produced when said trigger circuit receives a second predetermined signal of a given value, and means including a motor control relay circuit responsive to said command pulses and coupled to said primary motion actuator, said command pulse responsive means establishing output signals to effect selected motion of said primary motion actuator in a first direction and reverse the direction of said actuator and thereby reverse the direction of motion of the slide plate.

8. A device as defined in claim 7 wherein said trigger circuit includes two unijunctions which serve to produce separate command pulses, and a differential amplifier circuit responsive to said output signals to trigger one of said two unijunctions to thereby produce a command pulse.

9. In a welding machine, an oscillator slide assembly and control circuit for effecting oscillatory motion of an oscillator slide plate, comprising, in combination, means for supporting the oscillator slide plate for rectilinear oscillatory motion, primary motion actuator means operatively associated with the oscillator slide plate and including means for selectively effecting constant adjustable rectilinear oscillatory motion of said plate, and means for controlling said primary motion actuator including: oscillator plate position control circuit means responsive to the position of the oscillator slide plate to produce output signals in direct relation to the position of the slide plate during oscillation thereof, circuit means responsive to said output signals to provide command pulses, and means including a motor control relay circuit responsive to said command pulses and coupled to said primary motion actuator, said command pulse responsive means establishing output signals to effect selected motion of said primary motion actuator in a first direction and reverse the direction of said actuator and thereby reverse the direction of motion of the slide plate, said command pulse responsive means further including first and second dwell circuits to selectively effect a dwell period at the end of each stroke of the slide plate during oscillation thereof, said first dwell circuit including unijunction means to produce a delayed output signal, said second dwell circuit being adapted to receive a command pulse and including unijunction means to produce a delayed output signal, said second dwell circuit being further adapted to receive said delayed output signal from said first dwell circuit to terminate said delayed output signal from said second dwell circuit, said output signal from said second dwell circuit serving to effect energizing of said primary motion actuator whereby motion of said slide plate will be effected.

10. An apparatus as defined in claim 9 wherein said first and second dwell circuits include unijunction trigger circuits having timing potentiometers which may be adjusted to control the dwell time of the oscillator thereof.

11. An apparatus as defined in claim 10 including relay circuit means adapted to receive said delayed output signal from said second dwell timer circuit and having means operative upon receipt of said output signal to effect reversal of the direction of motion of said primary motion actuator.

12. In a control circuit for controlling a primary actuator to provide oscillatory motion of a slide plate having given excursion capability, the improvement comprising position control means including means for adjusting the desired means center of the slide movement within the excursion capability to different values, means for setting the limits of oscillation relative to said mean center, means including circuit means coupled to said slide plate for continually providing signals representative of the position of the slide plate to said positioning control means, and unijunction trigger circuit means for providing triggering signals to effect reversal of the primary actuator whenever the slide reaches either one of said limits.

13. A control circuit as defined in claim 12 wherein said position control means comprises a bridge circuit coupled to said oscillation limit setting means and adapted to receive said signals representative of the position of the slide plate, said bridge circuit having at least two output terminals for providing said triggering signals to effect reversal of the primary actuator.

14. In a control circuit for controlling a primary actuator to provide oscillatory motion of a slide plate having a given excursion capability, position control means including means for setting the desired mean center of the slide movement within the excursion capability to different values, means for setting the limit of oscillation in each direction relative to said mean center, means for continually providing signals representative of the position of the slide to said positioning means, output means including unijunction triggering circuit means for providing triggering signals when the slide reaches said limit in one direction, and means responsive to receipt of a trigger signal to interrupt movement of the primary actuator including potentiometer controlled unijunction means for providing a predetermined dwell period prior to re-energization of the primary actuator to move the slide in the opposite direction.

15. In a welding machine having a slide plate supported for rectilinear reciprocating motion and a primary actuator to provide rectilinear reciprocating motion of the slide plate between first and second preset limits, the improvement comprising, a control circuit for energizing the primary actuator including means for providing a triggering signal when the slide is moved to either of said limits, trigger means including unijunction circuit means responsive to said signals to provide at least one command pulse indicating movement of the slide to one of said limits, trigger relay circuit means connected to said trigger means including a first means for interrupting the energizing circuit to the primary actuator responsive to movement of the slide to either one of said limits, enabling means for said primary actuator including controlled rectifier means for changing the direction of movement of the primary actuator with each operation of said enabling means, and means controlled by said triggering signal for operating said enabling means only after a predetermined dwell period subsequent to said circuit interruption.

16. A control circuit as defined in claim 20 wherein said means controlled by said triggering signal for operating said enabling means includes manually operable potentiometer means for selectively varying said dwell period.

17. A control circuit controlled by a primary actuator to provide oscillatory motion for a slide plate between first and second preset limits, comprising, means for providing a triggering signal when the slide reaches either of said limits, trigger means responsive to said signals to provide at least one command pulse indicating movement of the slide to one of said limits, means connected to said trigger means including a first means for interrupting the energizing circuit to the primary actuator responsive to movement of the slide to either one of said limits, actuator enabling means for the primary actuator including means for changing the direction of movement of the primary actuator with each operation of said enabling means, a first dwell measuring means including potentiometer controlled unijunction means for measuring a dwell period upon movement of said slide to one of said limits, a second dwell measuring means including unijunction means controlled by said trigger means to measure a dwell period upon movement of said slide to the other one of said limits, a control circuit including a first rectifier switch controlled by said trigger means to operate said first dwell measuring means, and thereby said enabling means with movement of said slide to said one limit, and to establish a holding circuit for said enabling means, and a second rectifier switch for disabling said first switch and said enabling means responsive to operation of said second dwell measuring means.

References Cited
UNITED STATES PATENTS

| | | | |
|---|---|---|---|
| 2,885,620 | 5/1959 | Haas | 318—286 |
| 3,051,881 | 8/1962 | Baudin | 318—20.500 |
| 3,070,695 | 12/1962 | Stickney et al. | 318—282 |
| 3,230,341 | 1/1968 | Blackburn | 318—281 XR |

ORIS L. RADER, Primary Examiner

L. CROSSON, Assistant Examiner

U.S. Cl. X.R.

318—257, 266, 286, 138

UNITED STATES PATENT OFFICE
CERTIFICATE OF CORRECTION

Patent No. 3,509,436  April 28, 1970

Hubert T. Hovance

It is certified that error appears in the above identified patent and that said Letters Patent are hereby corrected as shown below:

In the heading to the printed specification, lines 4 and 5, "assignor to Auto Arc-Weld Mfg. Co., Cleveland, Ohio, a corporation" should read -- assignor, by mesne assignments, to National-Standard Company, Niles, Mich., a corporation of Delaware --.

Signed and sealed this 22nd day of December 1970.

(SEAL)
Attest:

Edward M. Fletcher, Jr.  WILLIAM E. SCHUYLER, JR.
Attesting Officer  Commissioner of Patents